US008484206B2

(12) United States Patent
Schmidt et al.

(10) Patent No.: US 8,484,206 B2
(45) Date of Patent: Jul. 9, 2013

(54) GENERATING REPORT OF IDENTIFIERS AND TIME VALUES

(75) Inventors: Olaf Schmidt, Walldorf (DE); Martin P. Fischer, Heidelberg (DE)

(73) Assignee: SAP AG, Walldorf (DE)

( * ) Notice: Subject to any disclaimer, the term of this patent is extended or adjusted under 35 U.S.C. 154(b) by 23 days.

(21) Appl. No.: 13/182,100

(22) Filed: Jul. 13, 2011

(65) Prior Publication Data

US 2013/0018926 A1  Jan. 17, 2013

(51) Int. Cl.
*G06F 17/30* (2006.01)
*H04L 12/58* (2006.01)

(52) U.S. Cl.
CPC .................................... *H04L 12/58* (2013.01)
USPC ........... 707/726; 707/603; 707/776; 707/805; 707/812; 705/7.11; 705/7.22

(58) Field of Classification Search
CPC ...................................................... H04L 12/58
USPC ............. 707/1, 200, 805, 600, 603, 613, 654, 707/790, 791, 802, 821, 812, 809, 726, 776
See application file for complete search history.

(56) References Cited

U.S. PATENT DOCUMENTS

| 6,065,014 | A | 5/2000 | Wakio et al. | |
|---|---|---|---|---|
| 7,016,919 | B2 * | 3/2006 | Cotton et al. | 707/999.1 |
| 7,072,934 | B2 | 7/2006 | Helgeson et al. | |
| 7,580,928 | B2 * | 8/2009 | Wu et al. | 707/999.004 |
| 8,103,534 | B2 * | 1/2012 | Kruk et al. | 705/7.22 |
| 8,214,238 | B1 * | 7/2012 | Fairfield et al. | 705/7.11 |
| 8,296,170 | B2 * | 10/2012 | O'Brien et al. | 705/7.12 |
| 8,321,251 | B2 * | 11/2012 | Opalach et al. | 705/7.11 |
| 2002/0049749 | A1 | 4/2002 | Helgeson et al. | |
| 2003/0061132 | A1 | 3/2003 | Yu, Sr. et al. | |
| 2005/0021554 | A1 | 1/2005 | Inokuchi et al. | |
| 2007/0067196 | A1 * | 3/2007 | Usui | 705/8 |
| 2009/0319544 | A1 * | 12/2009 | Griffin et al. | 707/100 |
| 2010/0049746 | A1 * | 2/2010 | Aebig et al. | 707/200 |
| 2010/0106551 | A1 | 4/2010 | Koskimies et al. | |
| 2010/0107164 | A1 | 4/2010 | Koskimies et al. | |
| 2010/0107165 | A1 | 4/2010 | Koskimies et al. | |
| 2012/0246260 | A1 * | 9/2012 | Kama | 709/217 |

FOREIGN PATENT DOCUMENTS

| WO | 01/52056 | 7/2001 |
|---|---|---|
| WO | 2010/046526 | 4/2010 |

* cited by examiner

*Primary Examiner* — Fred I Ehichioya
*Assistant Examiner* — Dangelino Gortayo
(74) *Attorney, Agent, or Firm* — Fish & Richardson P.C.

(57) ABSTRACT

Among other disclosure, a computer-implemented method for business process reporting includes receiving, at a server device, a first identifier of a business document, the business document being an instance of a business document type and having a first timestamp. The method includes polling multiple systems with the first identifier using the server device, the polling requesting (i) second identifiers for related objects of the business document according to a relationship model that is local to the system being polled, and (ii) metadata associated with the second identifiers, including second timestamps associated with the related objects; performing polling of at least some of the multiple systems with the second identifiers and any subsequently received identifiers using the server device, until the polling has been performed for all received identifiers. The method includes generating a report regarding the business document, the report including at least the received identifiers and all received timestamps.

20 Claims, 6 Drawing Sheets

| Relationship Tree | | Description | Object Type | Key | LogSy... | Name | Origin |
|---|---|---|---|---|---|---|---|
| ▼ Purchase Order | 306 | 0000000064 | BUS2032 | 0000000064 | P6DC... | P6DCL | Database |
| ... | | | | | | | |
| ▼ Outbound Delivery | 310 | 0080000060 | LIKP | 0080000060 | P6DC... | P6DCL | Database |
| ... | | | | | | | |
| 312 ▼ Material Document | 316 | 0090000035 | VBRK | 0090000035 | P6DC... | P6DCL | Not Found |
| 318 ▼ Accounting Document | | 0001 0090000035 2001 | BKPF | 0001 0090000035 20 | P6DC... | P6DCL | Database |

GENERATING REPORT OF IDENTIFIERS AND TIME VALUES

TECHNICAL FIELD

This document relates to techniques for reporting on business processes and the business documents created within those processes.

BACKGROUND

Business documents can be created as part of business processes. For example, a business process related to purchasing can create one or more purchase order documents as well as other related documents, such as material, outbound delivery and accounting documents. In some situations, the documents can be related hierarchically, e.g., meaning that purchase order documents can logically include material, outbound delivery and accounting documents.

Business processes can be performed across boundaries of multiple computer systems, some or all of which can be in different locations. As a result, the time necessary to complete a business process and to create the corresponding business document can in turn depend on how long it takes to generate and/or complete related documents that may be created at various locations throughout the world. Each of the locations, for example, can have different hardware, personnel and unique conditions, some or all of which can contribute to the time needed to complete a business document and/or part of a business process.

SUMMARY

In a first aspect, a computer-implemented method for business process reporting comprises: receiving, at a server device, a first identifier of a business document, the business document being an instance of a business document type and having a first timestamp; polling multiple systems with the first identifier using the server device, the polling requesting (i) second identifiers for related objects of the business document according to a relationship model that is local to the system being polled, and (ii) metadata associated with the second identifiers, including second timestamps associated with the related objects; performing polling of at least some of the multiple systems with the second identifiers and any subsequently received identifiers using the server device, until the polling has been performed for all received identifiers; and generating a report regarding the business document, the report including at least the received identifiers and all received timestamps.

Implementations can provide any, all, or none of the following features. The computer-implemented method further comprises processing the received timestamps to calculate aggregate times for at least the business document and the related objects. The computer-implemented method further comprises: grouping the first and second timestamps on a system basis; identifying clusters of correlated objects based at least on the groupings, where the correlated objects are determined the related objects of the business document; and generating a three-dimensional graph that shows the identified clusters, where a first dimension of the graph represents the respective system, a second dimension of the graph represents a nominal value, and a third dimension of the graph represents mean processing times for the correlated objects of the business document. The computer-implemented method further comprises: receiving, at the server device, at least one benchmark value for a user-defined threshold for a maximum processing time; identifying, using the received timestamps, that the benchmark value is exceeded; and highlighting at least one relationship in the report based on the identification. The computer-implemented method further comprises identifying business process bottlenecks among the related objects. Polling the multiple systems is done using application-specific callback functions. The computer-implemented method further comprises using a graph data structure to represent the business document, where the nodes of the graph data structure include a node representing the business document and nodes representing the objects and sub-objects that are related to the business document, and where the edges of the graph data structure include time values associated with adjacent nodes.

In another aspect, a computer program product is tangibly embodied in a computer-readable storage medium and comprises instructions that when executed by a processor perform a method for business process reporting. The method comprises: receiving, at a server device, a first identifier of a business document, the business document being an instance of a business document type and having a first timestamp; polling multiple systems with the first identifier using the server device, the polling requesting (i) second identifiers for related objects of the business document according to a relationship model that is local to the system being polled, and (ii) metadata associated with the second identifiers, including second timestamps associated with the related objects; performing polling of at least some of the multiple systems with the second identifiers and any subsequently received identifiers using the server device, until the polling has been performed for all received identifiers; and generating a report regarding the business document, the report including at least the received identifiers and all received timestamps.

Implementations can provide any, all, or none of the following features. The method further comprises processing the received timestamps to calculate aggregate times for at least the business document and the related objects. The method further comprises: grouping the first and second timestamps on a system basis; identifying clusters of correlated objects based at least on the groupings, where the correlated objects are determined the related objects of the business document; and generating a three-dimensional graph that shows the identified clusters, where a first dimension of the graph represents the respective system, a second dimension of the graph represents a nominal value, and a third dimension of the graph represents mean processing times for the correlated objects of the business document. The method further comprises: receiving, at the server device, at least one benchmark value for a user-defined threshold for a maximum processing time; identifying, using the received timestamps, that the benchmark value is exceeded; and highlighting at least one relationship in the report based on the identification. The method further comprises identifying business process bottlenecks among the related objects. Polling the multiple systems is done using application-specific callback functions. The method further comprises using a graph data structure to represent the business document, where the nodes of the graph data structure include a node representing the business document and nodes representing the objects and sub-objects that are related to the business document, and where the edges of the graph data structure include time values associated with adjacent nodes.

In another aspect, a computer system comprises one or more processors and a computer program product tangibly embodied in a computer-readable storage medium and comprising instructions that when executed by the processor perform a method for business process reporting. The method comprises: receiving, at a server device, a first identifier of a business document, the business document being an instance of a business document type and having a first timestamp; polling multiple systems with the first identifier using the server device, the polling requesting (i) second identifiers for related objects of the business document according to a relationship model that is local to the system being polled, and (ii) metadata associated with the second identifiers, including second timestamps associated with the related objects; performing polling of at least some of the multiple systems with the second identifiers and any subsequently received identifiers using the server device, until the polling has been performed for all received identifiers; and generating a report regarding the business document, the report including at least the received identifiers and all received timestamps.

Implementations can provide any, all, or none of the following features. The method further comprises processing the received timestamps to calculate aggregate times for at least the business document and the related objects. The method further comprises: grouping the first and second timestamps on a system basis; identifying clusters of correlated objects based at least on the groupings, where the correlated objects are determined the related objects of the business document; and generating a three-dimensional graph that shows the identified clusters, where a first dimension of the graph represents the respective system, a second dimension of the graph represents a nominal value, and a third dimension of the graph represents mean processing times for the correlated objects of the business document. The method further comprises: receiving, at the server device, at least one benchmark value for a user-defined threshold for a maximum processing time; identifying, using the received timestamps, that the benchmark value is exceeded; and highlighting at least one relationship in the report based on the identification. Polling the multiple systems is done using application-specific callback functions. The method further comprises using a graph data structure to represent the business document, where the nodes of the graph data structure include a node representing the business document and nodes representing the objects and sub-objects that are related to the business document, and where the edges of the graph data structure include time values associated with adjacent nodes.

Particular implementations may realize none, one or more of the following advantages. For example, reports can identify potential optimization opportunities determined using graph algorithms applied to a graph representation of the business document and related objects. For example, the optimization opportunities can be based on user-defined thresholds for acceptable processing times. For example, a report can present the information using a hierarchical representation of a business document that shows its structure of subordinate business documents. Further, time-related information included on a report can provide a user with a convenient way to inspect time-related problems or trends associated with the creation of the business document.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes techniques for discovering, and reporting on, relationships for one or more particular objects, such as a business document. For example, a business document A can have related (e.g., subordinate) business documents B1, B2 and B3, each of which can be created, or otherwise exist, at a different system location than that of A. To generate a report for the business document A, each of the different system locations can be polled (e.g., using an A identifier as an input) to discover related documents (e.g., B1-B3). However, any or all of the business documents B1-B3 can in turn have their own related business document (s). The different system locations are therefore also polled for the business document B1, and so on. Polling of different locations in this way, and iterative re-polling based on the received identifiers, discovers the relationships among business documents. Process-related time values of the related business documents can also be determined and used to analyze process efficiency, such as for a report for the business document A. In some implementations, the report can include the processing times needed to create the business document A and its related business documents B1-B3, and so on.

Figure 1:
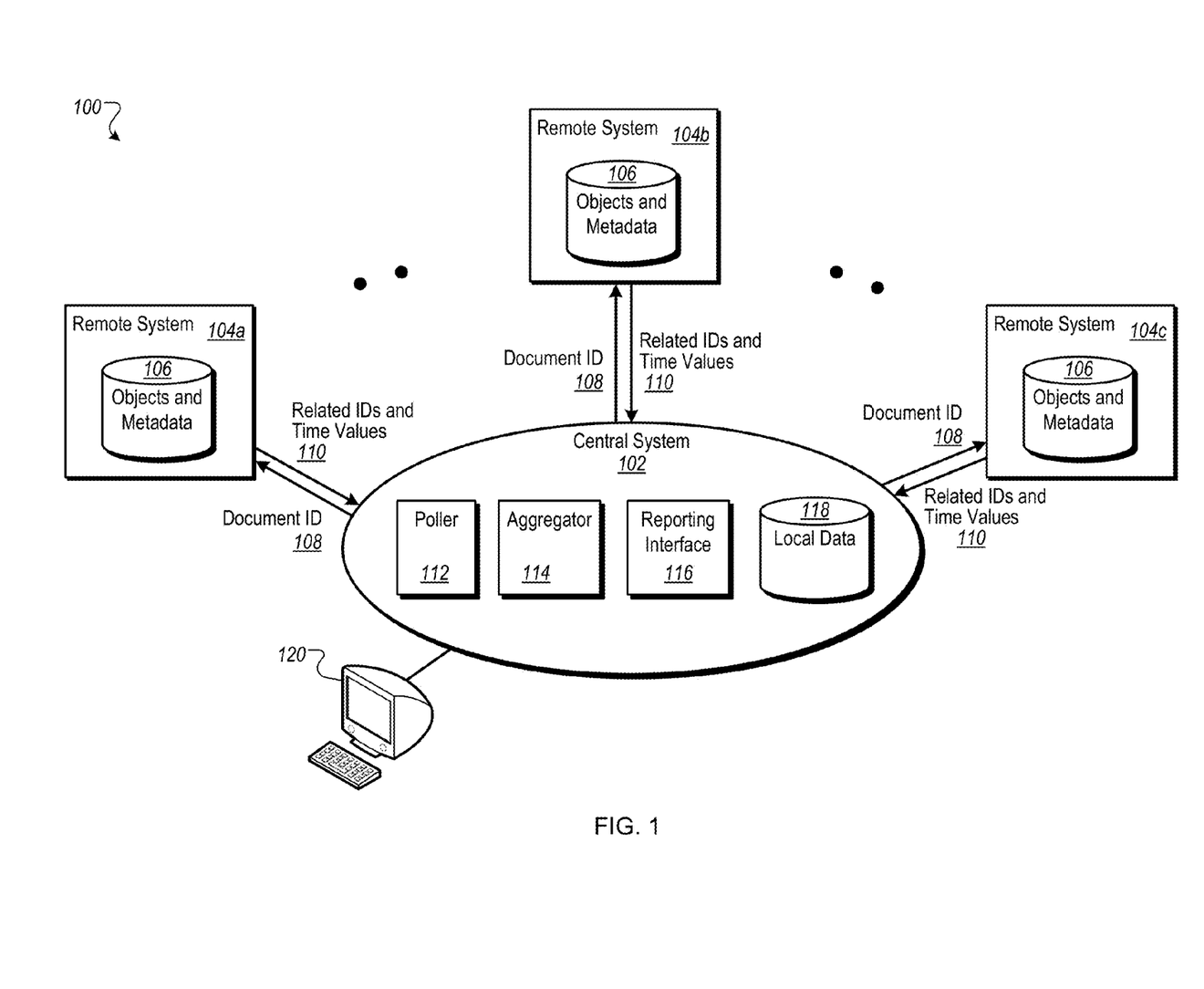
FIG. 1 is a block diagram of an example system of networked systems that can collectively perform one or more business processes.

FIG. 1 shows an example system 100 of networked systems that can collectively perform one or more business processes. In general, the system 100 performs business process reporting, including reporting that identifies the time taken to complete certain parts of the business processes and to create business documents associated with the business processes. For example, a purchase order document created at one location can logically include (e.g., based on a document hierarchy) material documents, outbound delivery documents and accounting documents created at other locations.

More particularly, the system 100 includes a central system 102 that is networked communicatively with remote systems 104a-104c, which are here shown as examples of many different remote systems that can exist. The central system 102 can include one or more general-purpose computers and/or special-purpose computers. The central system 102 can include, for example, a server device that is implemented and operates in one location and that communicates with the remote systems 104a-104c, which can be located nearby or anywhere throughout the world. The remote systems 104a-104c can use different applications to create related documents, e.g., documents related to a purchase order document. In some implementations, any or all of the remote systems 104a-104c can be in the same general location as the central system 102. Communication between the central system 102 and the remote systems 104a-104c can use various networks, e.g., the Internet, local area networks (LANs), wide area networks (WANs), other networks, and any combination thereof.

Each of the remote systems 104a-104c has a data store 106 for objects and metadata. In some implementations, the data store 106 can contain, for example, information for that remote system's objects (e.g., business documents) and time values associated with each object. As an example, the time values can include, for each object, timestamps that indicate when the business document was created and when the processing completed for the business document. The data store 106 can also identify information associated with processing the object, such as a plant identifier (e.g., a plant name or number) at which the object was created, server name(s) used to create the object, the name(s) of personnel who assisted in the completion of the object, and so on.

The data store 106 can also include a relationship model that identifies relationships among documents, e.g., based on document IDs and/or the types of documents. For example, as part of a business process, the remote system 104a may create purchase order documents. In this example, the relationship model at the remote system 104a can indicate the relationship of each of its documents to other documents having particular document IDs. One example relationship is the relationship between the purchase order document created at another location and the material document at the remote system 104a that the purchase order document logically includes.

The central system 102, in its communication with the remote systems 104a-104c, can provide a document ID 108 to any or all of the remote systems 104a-104c and receive the related IDs and time values 110 associated with the document ID 108. For example, the document ID 108 that the central system 102 provides to the remote systems 104a-104c can be the document ID of a purchase order document. In response, the remote systems 104a-104c can provide related IDs and time values 110 for related material documents, outbound deliver documents, accounting documents, and/or any other documents related to the purchase order document. In some implementations, time values can include timestamps for creation times, processing times and other times associated with the document.

In some implementations, the central system 102 includes a poller 112 for polling the remote systems 104a-104c, an aggregator 114 for aggregating information received from the remote systems 104a-104c, and a reporting interface 116 for providing access to reports. In some implementations, the central system 102 includes local data 118 that can identify the remote systems 104a-104c that are to be polled and can include instructions and/or parameters that are specific to each remote system 104a-104c and/or the applications that they use.

In some implementations, polling the multiple remote systems 104a-104c can be done using application-specific callback functions. For example, the central system 102 can maintain a table of registered application-specific callback functions, each of which can be used to poll a specific one of the multiple remote systems 104a-104c. In some implementations, each callback function can have a name that includes an identification of the type of object to which it applies. For example, callback functions related to purchase order documents can have "PO" in their names. When a callback function is used during polling, each call to the specific one of the remote systems 104a-104c can include an input parameter (e.g., using "purchase order 0000000064" as the document ID 108). The input parameter in this example identifies the object (e.g., purchase order document) and the specific instance of the object (e.g., the purchase order document having the ID "0000000064"). To obtain the sub-objects for the purchase order "0000000064" all at once, central system 102 can perform a callback to each of the multiple remote systems 104a-104c, using each remote system's application-specific callback function. As a result, the related IDs and time values 110 returned by the remote systems 104a-104c can include all of the sub-objects of the purchase order document having the document ID "0000000064" and the timestamps that correspond to the sub-objects. For example, any one of the remote systems 104a-104c can identify one or several sub-objects related to the object, or none at all if that particular remote system has created no business documents related to the purchase order having the document ID "0000000064."

In some implementations, document IDs of the related sub-objects can be added to a stack for further processing. For example, the document IDs of sub-objects of the purchase order object can be added to the stack so that polling can be applied recursively or iteratively to all the object identifiers on the stack until the stack is processed (e.g., empty). Recursive polling can occur, for example, until all of the sub-objects, sub-sub-objects, etc. in the hierarchy of the object's sub-objects are determined (e.g., all related documents and their related documents, and so on, are determined).

The following pseudo code describes an example of a process:

```
1.)  ADD input object ID to stack
2.)  WHILE stack is not empty.
3.)     NextObject = get top element of stack.
4.)     FOR all registered callback functions.
5.)        RelatedObjects = callback(NextObject).
6.)
        a)   ADD all objects from RelatedObjects to stack.
        b)   Store meta-information in appropriate data structure
7.)        EXTEND relationship graph by RelatedObjects.
8.)     END FOR.
9.)  END WHILE.
10.) DISPLAY relationship graph (or EXPORT)
```

In some implementations, as a result of using a callback function, the polled remote system 104a-104c can provide additional metadata related to the sub-object including, for example, timestamps related to the sub-object's creation time and processing time, organizational unit names, server names, and so on.

The central system 102 can communicate with at least one user device 120, e.g., any suitable device that provides and displays a user interface for interaction with the reporting interface 116. For example, the user device 120 can serve as the front-end to reports that are provided by the central system 102 and made available through the reporting interface 116. In some implementations, each of the remote systems 104a-104c can include the user device 120, e.g., to provide users at those remote systems 104a-104c with an interface for requesting and receiving reports generated by the central system 102.

In a detailed example, a user can employ a user interface operating on the user device 120 to request reports that are available through the reporting interface 116. For example, the user can specify a first identifier of a particular business document, e.g. by providing the document ID "00000064" for a purchase order document. The document identified by the user can be an instance of a business document type (e.g., a Purchase Orders type) and can have associated with it a first timestamp, e.g., the time at which the purchase order document was completed. In some implementations, to specify identifiers of one or more particular business documents, the user can use selection screens and controls (e.g., selection lists, text boxes, etc.) that can receive user selections of document IDs, document types, creation dates, creators (e.g., systems or people), and/or other fields that the user can use to search for and/or identify documents. In some implementations, the user can provide ranges of values (e.g., creation dates between X and Y, document IDs between 00000060 and 00000070, etc.) for selecting documents. The user device 120 can receive the user selection of a particular business document and can provide the information to the reporting interface 116. By doing so, for example, the user is requesting, in a single request, information for that business document and its related business documents.

Using the first identifier of the business document (e.g., the purchase order document with ID 00000064) as the document ID 108, the poller 112 can poll the multiple remote systems 104a-104c. In some implementations, the poller 112 can access the local data 118 to determine which of the remote systems 104a-104c are to be polled and how to poll them (e.g., using application-specific callback functions). By polling the remote systems 104a-104c, for example, the poller 112 can request second identifiers and associated metadata (e.g., including second timestamps) for objects that are related to the business document (e.g., documents related, hierarchically, to the purchase order document). As an example, for the purchase order document with the ID 00000064, the poller 112 can request second identifiers for related documents (e.g., material, outbound delivery and accounting documents) from the remote systems 104a-104c. Each of the remote systems 104a-104c can determine the related objects, for example, using a relationship model that is local to each of the remote systems 104a-104c being polled. For example, the remote system 104a, 104b and 104c can provide IDs and time values for material documents, outbound deliver documents and accounting documents, respectively.

However, some of those documents can have related documents of their own. Moreover, the related documents can exist on any of the multiple remote systems 104a-104c, or other remote systems not shown in FIG. 1. The poller 112, therefore, can perform repeated polling of at least some of the multiple systems with the second identifiers and any subsequently received identifiers (e.g., third identifiers, fourth identifiers, etc.) until the polling has been performed for all received identifiers and no more related documents remain to be identified. In some implementations, the set of received identifiers resulting from repeated polling can represent a hierarchy of business documents. Further, the first identifier that was used as the document ID 108 in the first polling can represent a business document anywhere on the hierarchy, such as the root, any of the branches, or leaves of a tree.

Continuing the current example, once polling is complete and identifiers and metadata have been obtained, the reporting interface 116 can generate one or more reports using the information. Reports, for example, can include at least the received identifiers and all received timestamps. For some reports, the aggregator 114 can aggregate information received for a business document. As an example, the aggregator 114 can process the received timestamps for objects related to the business document to calculate aggregate times for at least the business document and the related objects. Example aggregated information provided on reports can include mean processing times, standard deviations, or any other types of statistical information based on aggregated time values. The reporting interface 116, for example, can make reports produced by the central system 102 available to clients of the central system 102, e.g., the user device 120.

Figure 2:
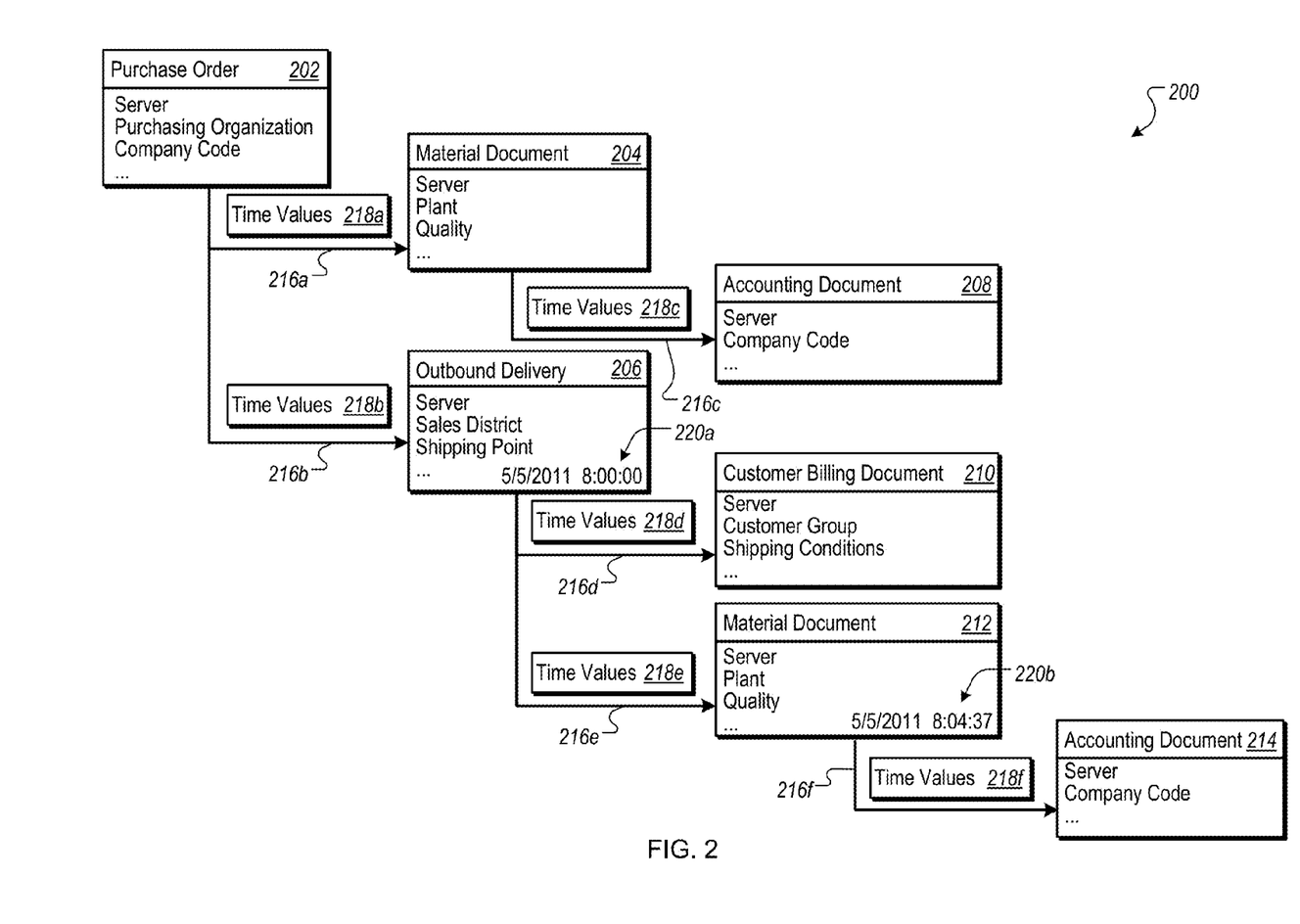
FIG. 2 is a diagram of an example report that represents a business document.

FIG. 2 shows an example report 200 that represents a business document. For example, the report 200 can include a graph data structure as shown in FIG. 2. In some implementations, the report 200 can be one type of report produced by the central system 102. In this example, the business document that is the basis for the report 200 is a purchase order, as indicated by a node 202, which is the root node (or hierarchically the highest-order node) in the report 200. In short, the report 200 illustrates at least part of the business process involving the business document (here, the purchase order), such as by showing other related documents or objects, and time values associated with them, to give the user an overview of the process execution.

The report 200 includes nodes 202-214 and edges 216a-216f. Each of the edges 216a-216f is depicted as an arrow that points from a parent node to a child node. For example, the edge 216a is the edge between the node 202 (representing the purchase order object) and the node 204 (representing a material document object, which is a sub-object of the purchase order object). In another example, the node 206 represents an outbound deliver document object, which is another sub-object of the purchase order document object, as indicated by the edge 216b that connects the nodes 202 and 206. Similarly, the edge 216c connects the nodes 204 and 208, showing that the accounting document object represented by the node 208 is a sub-object of the material document object represented by the node 204. Completing the rest of the graph data structure in the report 200, the nodes 210 and 212 are sub-nodes of the node 206, and the node 214 is a sub-node of the node 212. In this example, the accounting document object (e.g., represented by nodes 208 and 214) is a sub-object to the material document object, which itself is a sub-object of the objects represented by nodes 202 and 206. However, each node represents a separate instance of an object, meaning that the nodes 208 and 214, for example, represent separate instances of accounting document objects.

Each of the edges 216a-216f has corresponding time values 218a-218f, respectively. Each of the time values 218a-218f, for example, can include one or more time elements associated with adjacent nodes. For example, the time elements can be based on or include timestamp information associated with each node, including timestamp information provided by the remote systems 104a-104c during polling.

In some implementations, a time element can be a processing time that represents the time to create or complete a sub-object, e.g., based on the difference between the creation timestamps of a parent node and its child node. For example, the time values 218e can include a processing time of 4:37 that is the time difference of completion timestamps 220a and 220b (e.g., May 5, 2011 8:00:00 and May 5, 2011 8:04:37) associated with nodes 206 and 210, respectively. In this example, the material document object represented by the node 210 was completed 4:37 (four minutes and thirty-seven seconds) after the completion of the outbound delivery document object represented by the node 206.

In some implementations, a time element, instead of relating to a single instance of an object, can be an aggregated time for multiple object instances, e.g., including a mean processing time and a standard deviation. For example, when received timestamps are processed to calculate aggregate times for a business document and its related objects, the report 200 can provide statistics based on the aggregated values. As an example, the time values 218e can include "5:00±1:03" meaning that the mean time to produce the material document object is five minutes, and the standard deviation is 1:03.

In some implementations, graph data structure reports provided by the central system 102 can include controls that allow the user to toggle between different display modes, e.g., to alternate between displaying processing times and displaying mean times with standard deviations. In some implementations, other user-selectable time elements can be provided and displayed, such as minimum times, maximum times, and the number of aggregated steps. For example, a user can review the report 200 for a particular purchase order (e.g., to view its completion time), then display a similar report 200 showing mean times and standard deviations for purchase orders in general.

In some implementations, time values (e.g., the time values 218e) can identify (and/or be used by the user to identify) business process bottlenecks among the related objects. For example, the central system 102 (e.g., using the aggregator 114 and the reporting interface 116) can automatically highlight time values that have a large mean processing time or that have a standard deviation that exceeds a pre-determined percentage (e.g., 20%) of the mean.

In some implementations, a time element can be an aggregated time that indicates the total time to produce an object, e.g., the outbound delivery document object represented by the node 206. In this example, the aggregated time can be the sum of the times needed to produce the object and its sub-objects.

In some implementations, the report 200 can identify processing times that exceed benchmark values. For example, the central unit 102 can receive (e.g., from a user at the user device 120) a benchmark value that reflects a user-defined threshold for a maximum processing time associated with an object (e.g., three minutes for an accounting document). In some implementations, the benchmark value can be a range of processing times, including a maximum processing time for which creating the accounting document is not to be exceeded (e.g., a four-minute maximum time). Similarly, benchmark values can be provided for other objects and sub-objects and stored by the central unit 102. Then, when the report 200 is generated for an object using timestamps received from the remote systems 104, portions of the report 200 can be highlighted to identify processing times that exceed benchmark values. For example, if the time values 218a include a display of a processing time of six minutes for the material document object 204, then the time values 218a can be highlighted (e.g., by color, shading, etc.) to indicate that the benchmark value is exceeded. A user can use the information, for example, to identify bottlenecks in the business process.

Figure 3:
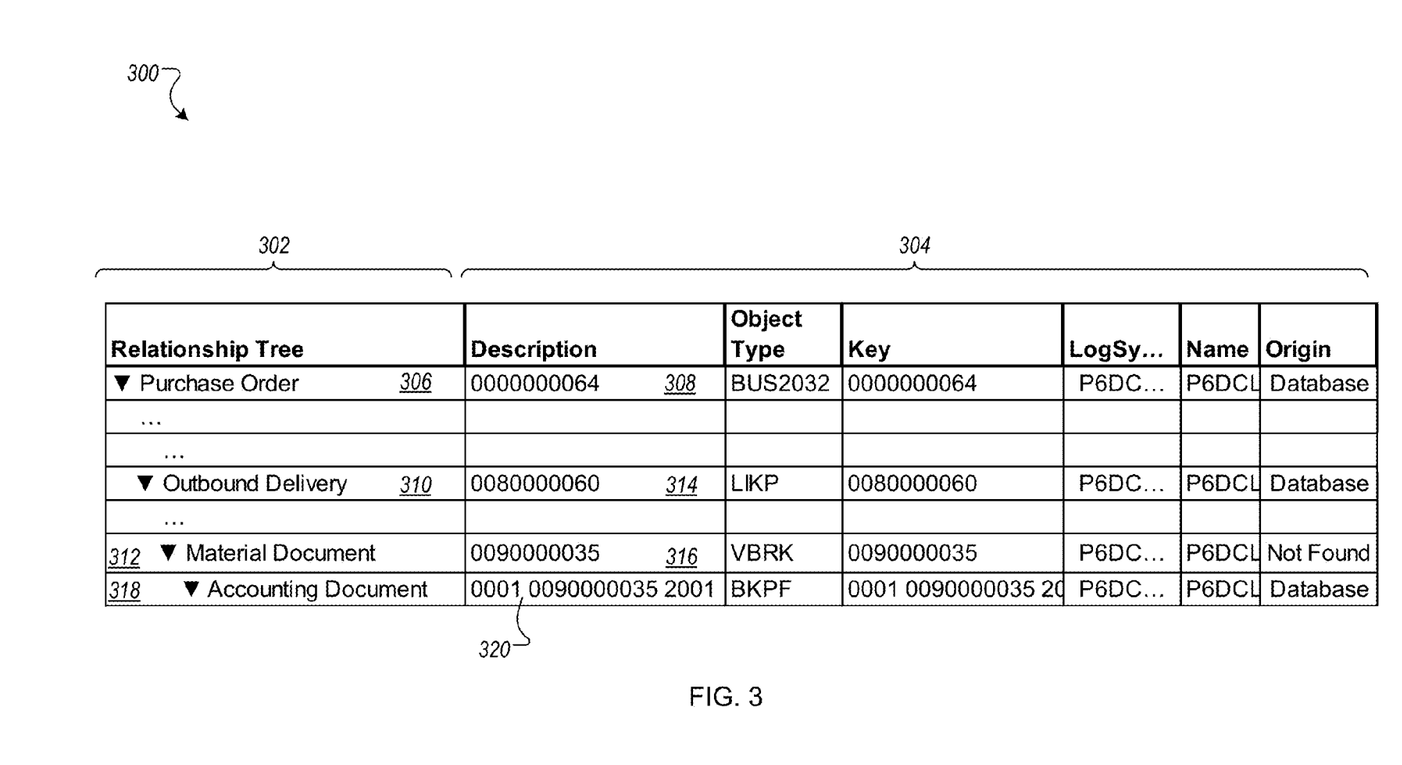
FIG. 3 is a diagram of an example hierarchical object/sub-object table.

FIG. 3 shows an example hierarchical object/sub-object table 300. The hierarchical object/sub-object table 300 identifies objects and related sub-objects in an object column 302. Value columns 304 shows field/attribute values for the objects and the related sub-objects that are identified in the object column 302. In some implementations, information for the hierarchical object/sub-object table 300 can be obtained, for example, by polling (and re-polling) the remote systems 104a-104c using the purchase order ID 308 of "0000000064" as the initial document ID 108, as described above. In some implementations, the hierarchical object/sub-object table 300 can form, or be included in, one of the reports provided by the central system 102.

The object column 302 shown in FIG. 3 uses indentation among the objects and related sub-objects to indicate hierarchical relationships. In some implementations, controls (e.g., clickable triangles) in the object column 302 can allow the user to show or hide an object's sub-objects.

In this example, the information that is in the hierarchical object/sub-object table 300 represents a purchase order document 306 (e.g., having a purchase order ID 308 of "0000000064"). Below the purchase order document 306 (and hierarchically indented) are the purchase order's sub-objects (e.g., an outbound delivery document 310), sub-sub-objects (e.g., a material document 312), and so on. For example, the purchase order document 306 having the purchase order ID 308 of "0000000064" is related to the outbound delivery document 310 having a document ID 314 of "0080000060." The outbound delivery document 310 is related to the material document 312 having an ID 316 of "0090000035," which is in turn related to an accounting document 318 having an ID 320 of "001 0090000035 2001." Although each of the documents 306, 310 and 312 shows just one sub-object, multiple sub-objects can exist in each case.

Figure 4:
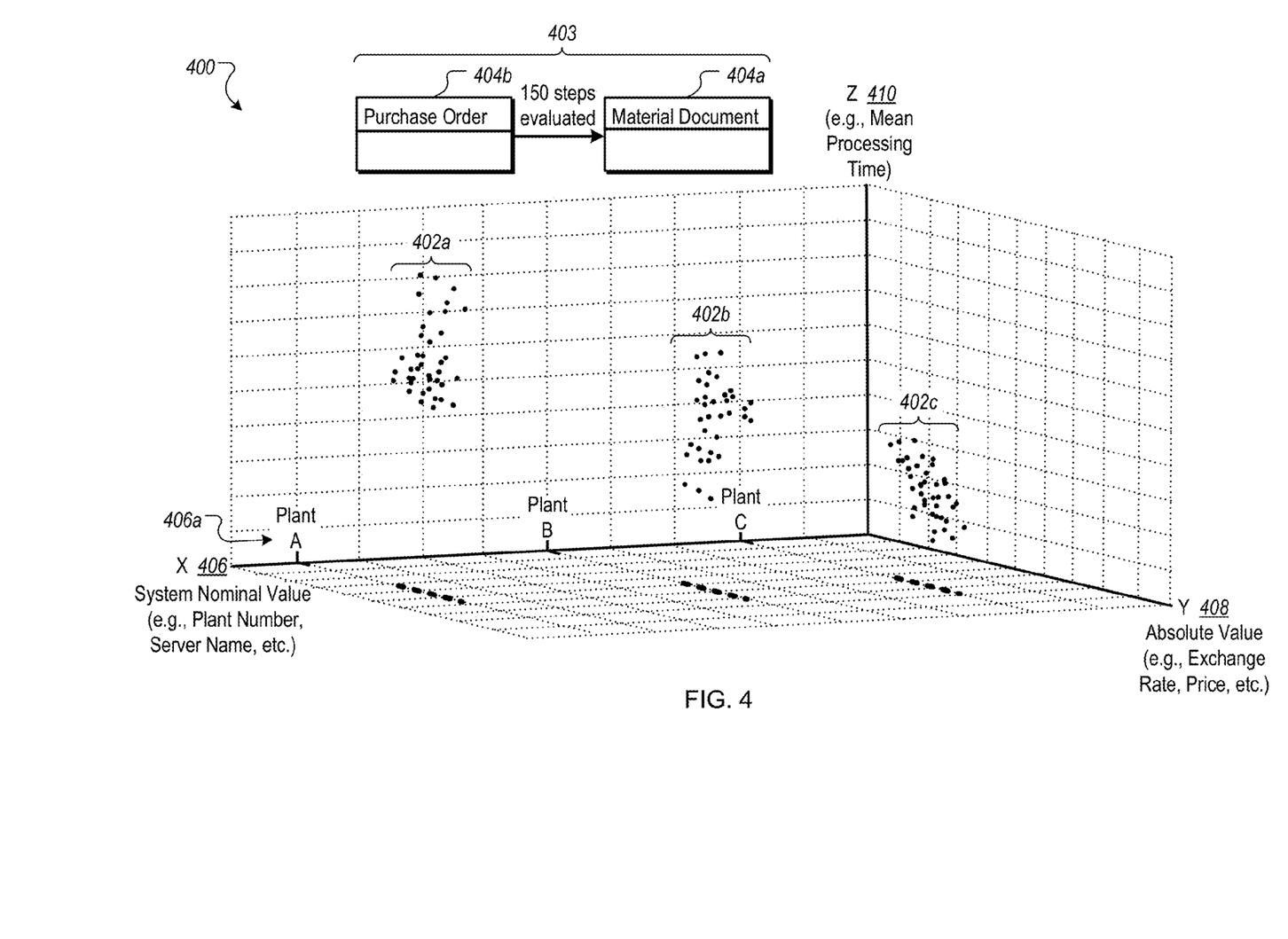
FIG. 4 is a diagram of an example three-dimensional graph.

FIG. 4 shows an example three-dimensional graph 400 on which data clusters 402a-402c are plotted. The data clusters 402a-402c represent clusters of processing times for correlated business-related objects. For example, a legend 403 indicates that the graph is for a material document object 404a that is a sub-object of a purchase order document object 404b. In some implementations, the data for the correlated objects can be obtained by polling the remote systems 104a-104c as described above, and the aggregator 114 can aggregate data for the data clusters 402a-402c.

For example, the data cluster 402a can be associated with processing times for creating the material object 404a at one plant (e.g., at the remote system 104a). Similarly, the data clusters 402b and 402c can be associated with processing times for creating the material object 404a at two other plants (e.g., at the remote systems 104b and 104c). In some implementations, the three-dimensional graph 400 can be one of the reports that are provided by the central system 102. Presenting the processing times using plotted data clusters 402a-402c in three dimensions can make it easier for the user to inspect and compare clusters. For example, the data cluster 402a, by virtue of appearing higher (in a vertical axis) in the three-dimensional graph 400 than the data clusters 402b and 402c, can indicate longer processing times. For example, longer processing times at one plant (e.g., at the remote system 104a) can be caused by the use of older computer hardware, differences in staffing, or other conditions.

The three-dimensional graph 400 includes three axes 406-410. In some implementations, the X axis 406 represents nominal discrete values corresponding to the names of process entities (e.g., plants, servers, etc.). For example, the X axis 406 can be labeled with plant names or numbers (e.g., "Plants A-C" 406a), server names, or the names of other entities involved in business processes. Some of the named process entities, for example, can be the names of entities at the remote systems 104a-104c or the names of the remote systems themselves. In this example, data in the form of data clusters 402a-402c for the corresponding "Plants A-C" 406a can be the only three plants that create material documents 404a.

In some implementations, the Y axis 408 represents absolute values, such as values that can be associated with fields or attributes of objects and sub-objects. Example values on the Y axis 408 include exchange rate, price, etc. The Z axis 410 represents a processing time (e.g., a mean processing time) that corresponds to a processing time to complete an object associated with values on the X axis 406 and the Y axis 408.

In one example, the data cluster 402a can represent mean processing times to create the material object 404a at Plant A, and the range of values relative to the Y axis 408 can correspond to a range of exchange rates. The data clusters 402b and 402c can represent mean processing times to create the material object 404a at Plants B and C, respectively, with mean times being plotted for a particular plant and relative to exchange rates on the Y axis 408.

In some implementations, the data that is displayed in the three-dimensional graph 400 can depend on a current user selection of an object (e.g., the material object 404a) and absolute values (e.g., exchange rate, price, etc.). For example, the user can choose to display information for a different object (e.g., an accounting document object) in relation to a different absolute value on the Y axis 408 (e.g., price). In this example, the reporting interface 116 can automatically produce data clusters that correspond to the user selections. In some implementations, the reporting interface 116 can automatically mark the X axis 406 using the names of plants, servers, etc. that correspond to the locations at which the objects (e.g., the material object 404a) are created.

In some implementations, the three-dimensional graph 400 can be one of several user-selectable report options provided by the reporting interface 116 and displayed on the user device 120. For example, other report options can include the report 200 described with reference to FIG. 2, the hierarchical object/sub-object table described with reference to FIG. 3, and other report options that present timing information related to business processes used to generate business documents. In some implementations, the user can select from controls to toggle from one report format to another. For example, while viewing the report 200 for a specific purchase order, the user can select a control to display the three-dimensional graph 400 to show mean processing times for material documents at different locations.

Figure 5:
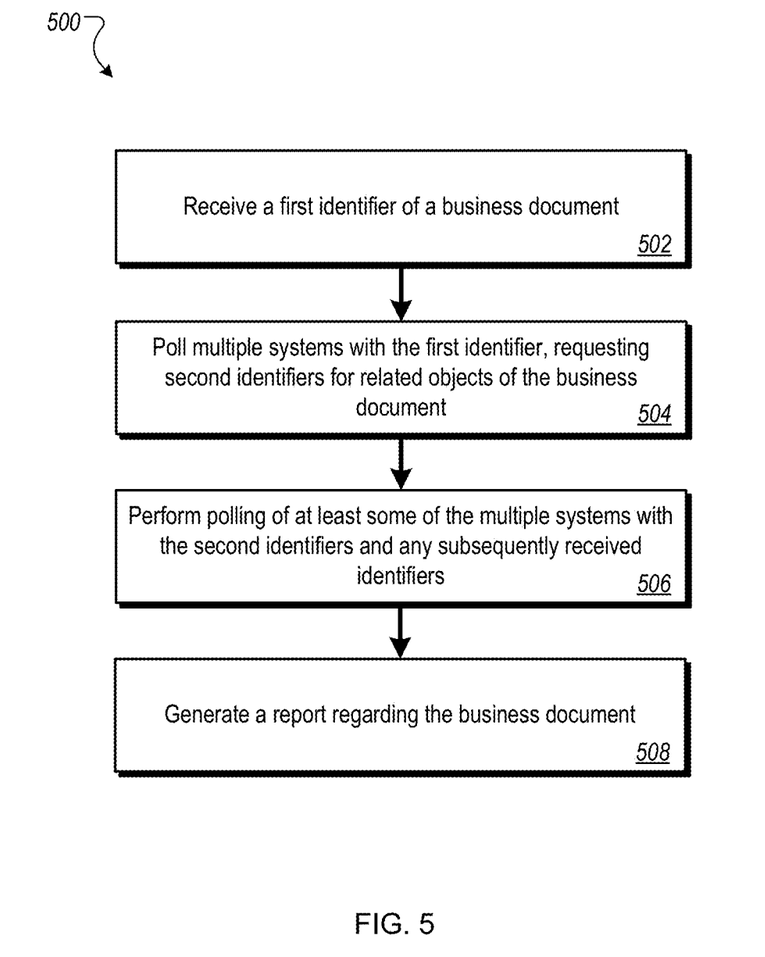
FIG. 5 is a flow diagram of an example process for business process reporting.

FIG. 5 shows an example process 500 for business process reporting. In one example, the process 500 can be implemented by the central system 102 described previously with respect to FIG. 1. For example, computer-readable medium may be configured to perform the process 500 when executing on a processor (or processors) of the central system 102. FIGS. 1-3 are used to provide examples for the process 500.

The process 500 begins with the receipt a first identifier of a business document at a server device (step 502). The business document is an instance of a business document type and has a first timestamp. For example, the reporting interface 116 can receive the document ID of a purchase order from a user using the user interface 120. The document ID, for example, can identify the purchase order business document (e.g., having a timestamp "May 5, 2011 7:56:00") for which the user wishes to know timing information for the purchase order document and related documents.

Using the server device, multiple systems are polled with the first identifier (step 504). The polling requests second identifiers for related objects of the business document according to a relationship model that is local to the system being polled. The polling also requests metadata associated with the second identifiers, including second timestamps associated with the related objects. Continuing the example, the poller 112 can use the first identifier (e.g., the purchase order document 202 having the document ID 108 of "0000000064" received by the reporting interface 116) to poll remote systems 104a-104c as described above. The process of polling is a request, for example, to each of the remote systems 104a-104c to provide related document IDs and associated metadata 110, including timestamps, for any documents related to the purchase order document having the document ID 108 of "0000000064." For example, as a result of the polling, one of the related document can be the outbound delivery document 206 having the document having a document ID 314 of "0080000060" and the completion timestamp 220a of "May 5, 2011 8:00:00".

Polling is performed of at least some of the multiple systems with the second identifiers and any subsequently received identifiers (step 506). The polling uses the server device and is performed until the polling has been performed for all received identifiers. For example, based on the received document IDs (e.g., "0080000060" for the outbound delivery document 206), the poller 112 can repeatedly poll the remote systems 104a-104c until all related IDs and time values 110 are determined, as described above.

In some implementations, time values that are obtained by polling and re-polling the remote systems 104a-104c can be stored in persistent storage. In this way, reports that use the timestamps can be generated without having to re-poll the remote systems 104a-104c for time values. In some implementations, purging of data stored in persistent storage can occur, e.g., to delete out-dated information older than a certain threshold (e.g., one year).

A report is generated regarding the business document (step 508). The report includes at least the received identifiers and all received timestamps. For example, the central system 102 can generate reports based on the received IDs and times values 110, and the reports can be available using the reporting interface 116. Example reports for a single purchase order document include the report 200 (e.g., showing processing times of sub-objects or related documents) and the hierarchical object/sub-object table 300 (e.g., showing related documents of the purchase order having the document ID "0000000064"). In some implementations, the aggregator 114 can aggregate information for reports. For example, reports can include the report 200 that shows aggregate time information (e.g., mean processing times and standard deviations). In another example, reports can include the three-dimensional graph 400 that shows data clusters 402a-402c of mean processing times for different plants.

In some implementations, the reports created by the central system 102 can include analysis reports. For example, the aggregator 114 can aggregate time information to produce analysis reports that include shortest path analysis, critical path analysis, and so on. Other analyses and reports are possible that identify time-related and/or path-related aspects of the business process and the steps used to create related business documents for a particular type of business document.

Figure 6:
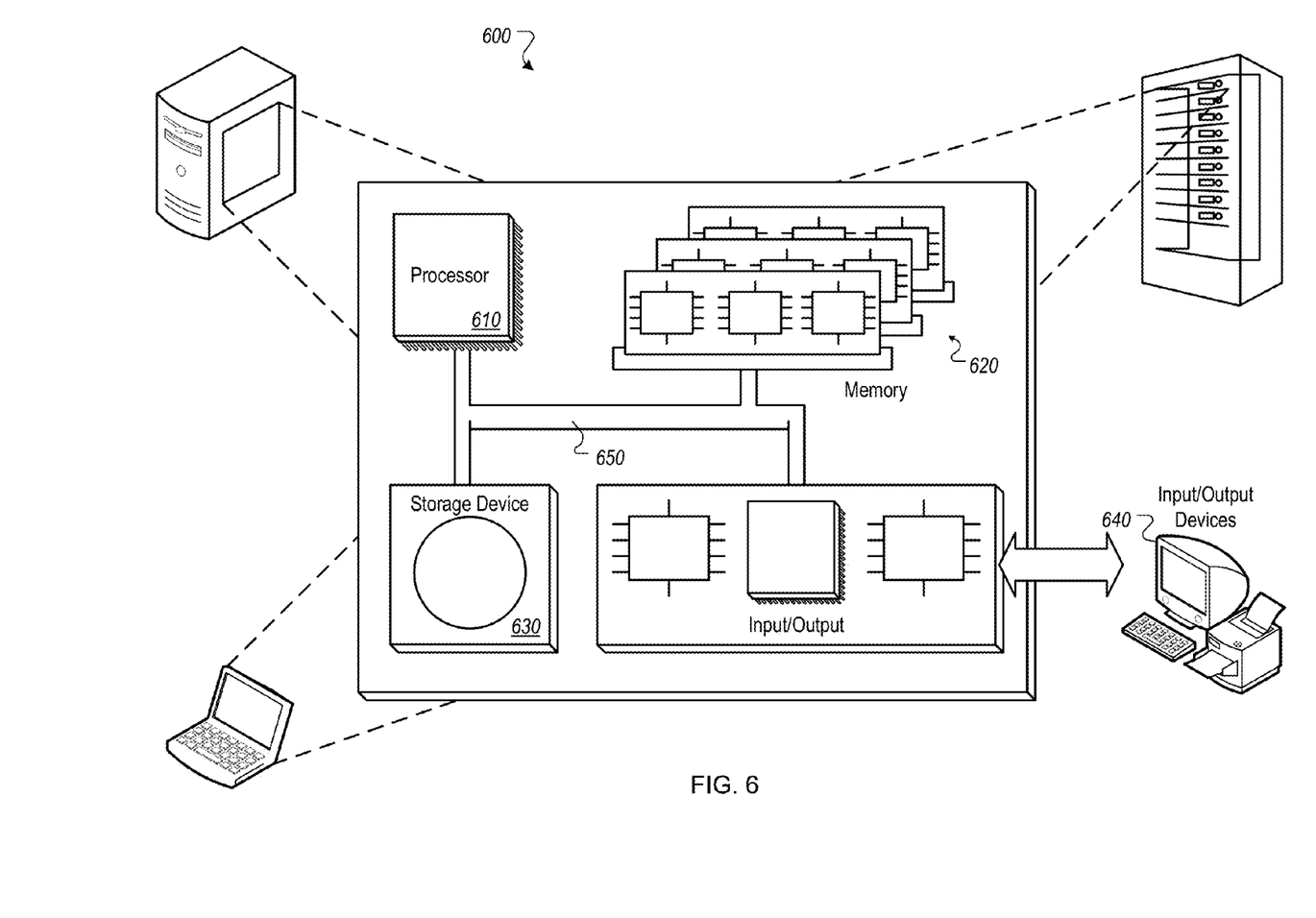
FIG. 6 is a block diagram of a computer system.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600.

In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for a first system to report on performance of a business process distributed between second systems, wherein the first system lacks identification of business documents used by the second systems in the business process, the method comprising:

receiving, at a first system, a first identifier of a business document that is generated or worked on in the business process, the business document having a first timestamp;

polling the second systems with the first identifier using the first system, the polling requesting (i) second identifiers for other business documents related to the business document according to a relationship model that is local to the second system being polled, the other business documents also being generated or worked on in the business process, and (ii) metadata associated with the second identifiers, including second timestamps for the other business documents;

performing iterative polling of at least some of the second systems with: (i) the received second identifiers and (ii) any subsequently received identifiers using the first system, in place of using the first identifier, the iterative polling ending when the iterative polling has been performed for all received identifiers; and generating a map of the business process as discovered by the polling and the iterative polling, the map reflecting the business process and including at least the received identifiers, received timestamps, and performance information for the business process.

2. The computer-implemented method of claim 1 further comprising:

processing the received timestamps to calculate aggregate times for at least the business document and the related other business documents.

3. The computer-implemented method of claim 1 further comprising:

grouping the first and second timestamps on a system basis;

identifying clusters of correlated objects based at least on the groupings, where the correlated objects are determined from relationships among the business document and the other business documents; and generating a three-dimensional graph that shows the identified clusters, where a first dimension of the graph represents the respective second system, a second dimension of the graph represents a nominal value, and a third dimension of the graph represents mean processing times for the correlated objects.

4. The computer-implemented method of claim 1 further comprising:

receiving, at the first system, at least one benchmark value for a user-defined threshold for a maximum processing time;

identifying, using the received timestamps, that the benchmark value is exceeded; and highlighting at least one relationship in the map based on the identification.

5. The computer-implemented method of claim 1 further comprising:

identifying business process bottlenecks among the business document and the related other business documents.

6. The computer-implemented method of claim 1 where polling the second systems is done using application-specific callback functions.

7. The computer-implemented method of claim 1 further comprising:
using a graph data structure to represent the business document, where the nodes of the graph data structure include a node representing the business document and nodes representing the other business documents that are related to the business document, and where the edges of the graph data structure include time values associated with adjacent nodes.

8. A computer program product tangibly embodied in a non-transitory computer-readable storage medium and comprising instructions that when executed by a processor perform a method for a first system to report on performance of a business process distributed between second systems, wherein the first system lacks identification of business documents used by the second systems in the business process, the method comprising:
receiving, at a first system, a first identifier of a business document that is generated or worked on in a business process distributed between second systems, the business document having a first timestamp;
polling the second systems with the first identifier using the first system, the polling requesting (i) second identifiers for other business documents related to the business document according to a relationship model that is local to the second system being polled, the other business documents also being generated or worked on in the business process, and (ii) metadata associated with the second identifiers, including second timestamps for the other business documents;
performing iterative polling of at least some of multiple second systems with: (i) the received second identifiers and (ii) any subsequently received identifiers using the first system, in place of using the first identifier, the iterative polling ending when the iterative polling has been performed for all received identifiers; and
generating a map of the business process as discovered by the polling and the iterative polling, the map reflecting the business process and including at least the received identifiers, received timestamps, and performance information for the business process.

9. The computer program product of claim 8, the method further comprising:
processing the received timestamps to calculate aggregate times for at least the business document and the related other business documents.

10. The computer program product of claim 8, the method further comprising:
grouping the first and second timestamps on a system basis;
identifying clusters of correlated objects based at least on the groupings, where the correlated objects are determined from relationships among the business document and the other business documents; and
generating a three-dimensional graph that shows the identified clusters, where a first dimension of the graph represents the respective second system, a second dimension of the graph represents a nominal value, and a third dimension of the graph represents mean processing times for the correlated objects of the business document.

11. The computer program product of claim 8, the method further comprising:
receiving, at the first system, at least one benchmark value for a user-defined threshold for a maximum processing time;
identifying, using the received timestamps, that the benchmark value is exceeded; and
highlighting at least one relationship in the map based on the identification.

12. The computer program product of claim 8, the method further comprising:
identifying business process bottlenecks among the business document and the related other business documents.

13. The computer program product of claim 8, where polling the second systems is done using application-specific callback functions.

14. The computer program product of claim 8, the method further comprising:
using a graph data structure to represent the business document, where the nodes of the graph data structure include a node representing the business document and nodes representing the other business documents that are related to the business document, and where the edges of the graph data structure include time values associated with adjacent nodes.

15. A computer system comprising:
one or more processors; and
a computer program product tangibly embodied in a computer-readable storage medium and comprising instructions that when executed by the processor perform a method for a first system to report on performance of a business process distributed between second systems, wherein the first system lacks identification of business documents used by the second systems in the business process, the method comprising:
receiving, at a first system, a first identifier of a business document that is generated or worked on in a business process distributed between second systems, the business document having a first timestamp;
polling the second systems with the first identifier using a first system, the polling requesting (i) second identifiers for other business documents related to the business document according to a relationship model that is local to the second system being polled, the other business documents also being generated or worked on in the business process, and (ii) metadata associated with the second identifiers, including second timestamps for the other business documents;
performing iterative polling of at least some of multiple second systems with: (i) the received second identifiers and (ii) any subsequently received identifiers using the first system, in place of using the first identifier, the iterative polling ending when the iterative polling has been performed for all received identifiers; and
generating a map of the business process as discovered by the polling and the iterative polling, the map reflecting the business process and including at least the received identifiers, received timestamps, and performance information for the business process.

16. The computer system of claim 15, the method further comprising:
processing the received timestamps to calculate aggregate times for at least the business document and the related other business documents.

17. The computer system of claim 15, the method further comprising:

grouping the first and second timestamps on a system basis;

identifying clusters of correlated objects based at least on the groupings, where the correlated objects are determined from relationships among the business document and the other business documents; and generating a three-dimensional graph that shows the identified clusters, where a first dimension of the graph represents the respective second system, a second dimension of the graph represents a nominal value, and a third dimension of the graph represents mean processing times for the correlated objects of the business document.

18. The computer system of claim 15, the method further comprising:

receiving, at the first system, at least one benchmark value for a user-defined threshold for a maximum processing time;

identifying, using the received timestamps, that the benchmark value is exceeded; and highlighting at least one relationship in the map based on the identification.

19. The computer system of claim 15, where polling the second systems is done using application-specific callback functions.

20. The computer system of claim 15, the method further comprising:

using a graph data structure to represent the business document, where the nodes of the graph data structure include a node representing the business document and nodes representing the other business documents that are related to the business document, and where the edges of the graph data structure include time values associated with adjacent nodes.

* * * * *